United States Patent [19]

Smith

[11] 4,151,161
[45] Apr. 24, 1979

[54] PREPARATION OF HIGH-QUALITY GELATINE HAVING LOW CHROMIUM CONTENT FROM CHROMED WASTE STOCK

[75] Inventor: Lynton R. Smith, Oakville, Canada

[73] Assignee: Canada Packers Limited, Toronto, Canada

[21] Appl. No.: 695,639

[22] Filed: Jun. 14, 1976

[51] Int. Cl.$^2$ .......................... A23J 1/10; C09H 3/00
[52] U.S. Cl. .................................... 260/118; 260/117
[58] Field of Search .............................. 260/118, 117

[56] References Cited

U.S. PATENT DOCUMENTS

| | | | |
|---|---|---|---|
| 1,340,721 | 5/1920 | Lamb | 260/118 |
| 2,339,405 | 1/1944 | Hoeren | 260/118 |
| 3,153,030 | 10/1964 | Consolazio et al. | 260/118 |
| 3,232,924 | 1/1966 | Moses et al. | 260/118 |
| 3,637,642 | 1/1972 | Fujii | 260/118 |
| 3,767,448 | 10/1973 | Hutton | 260/118 X |

OTHER PUBLICATIONS

Journal of Institutions of Higher Learning, Technology of the Light Industry, (USSR), No. 5, 1968, Baskova et al., pp. 1–15 of English Translation.
Chem. Abstracts, vol. 63, 1965, 4523f, Babloyan et al.
Encyclopedia of Chemical Technology, vol. 10, 1967, pp. 505–506, Kirk et al.
Chem. Abstracts, vol. 70, 1969, 48631d, Baskova et al.
Chem. Abstracts, 1945, 4357$^3$, Edge et al.
Chem. Abstracts, 1947, 878$^f$, Edge et al.
Encyclopedia of Chemical Technology, vol. 5, 1964, Kirk–Othmer, pp. 473, 476–481, 498, 500–510–511.

Primary Examiner—Howard E. Schain
Attorney, Agent, or Firm—Bacon & Thomas

[57] ABSTRACT

A process for preparing low chromium content gelatine from a chrome stock containing trivalent chromium which comprises treating a trivalent chromium-containing stock with a solution of a compound which forms coordination complexes with trivalent chromium present in said stock, conditioning the thus treated stock to partially depolymerize the collagen network of said stock, oxidizing a substantial portion of the residual trivalent chromium in said stock to the hexavalent state, washing said stock containing hexavalent chromium to partially remove said hexavalent chromium, extracting gelatine from the remaining stock, and subjecting the extracted gelatine to ion exchange treatment to remove further hexavalent chromium.

17 Claims, 1 Drawing Figure

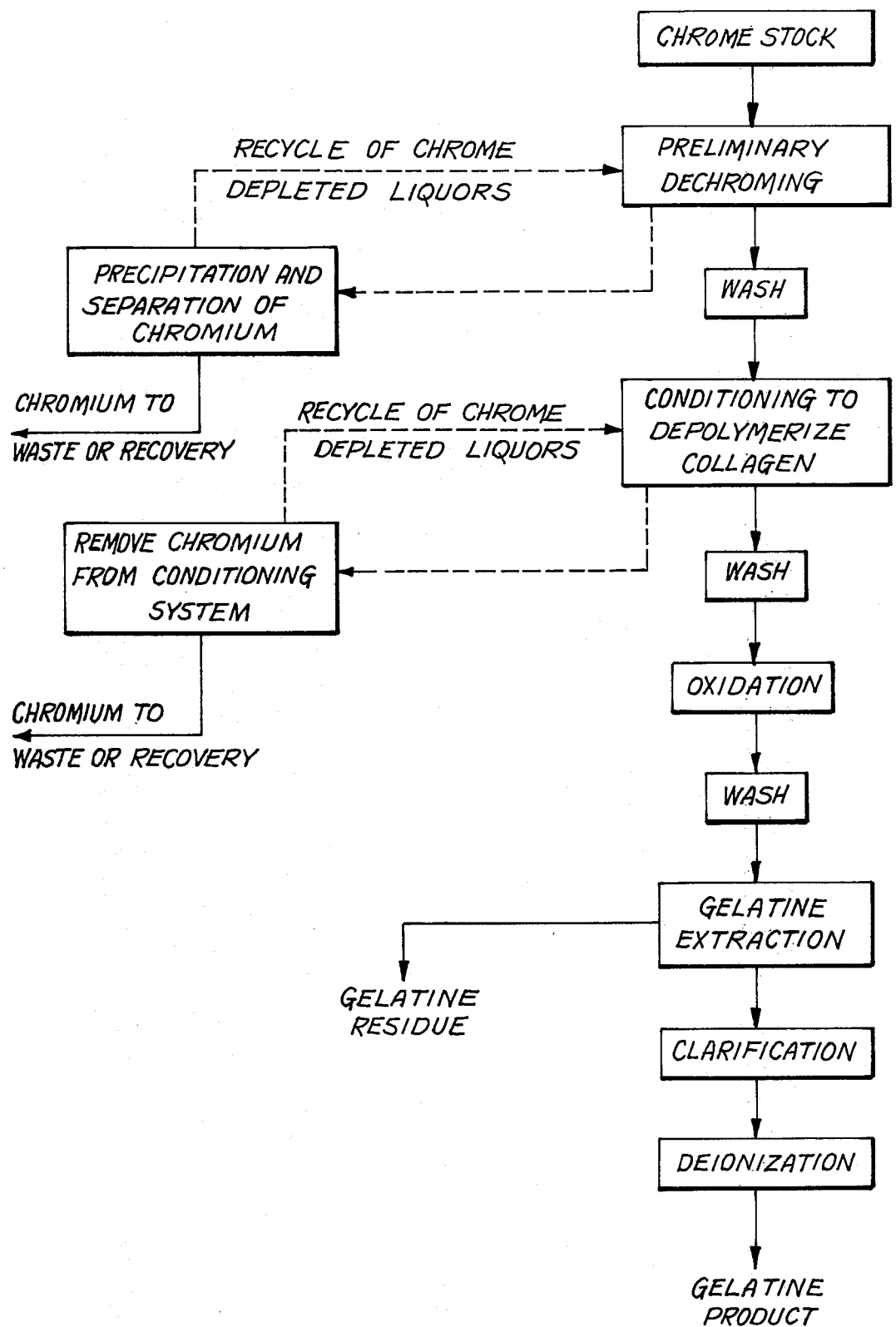

PREPARATION OF HIGH-QUALITY GELATINE HAVING LOW CHROMIUM CONTENT FROM CHROMED WASTE STOCK

This invention relates to a process for the preparation of gelatine having a low chromium content, high bloom strengths and viscosities by extraction from chromed waste stock. The process may also include a recycling stage wherein chromium is separated from a treatment solution enabling reuse of the treatment solution in the process for obtaining low chromium content gelatine.

Chromed scrap or waste stock has long been recognized as a potentially valuable source of gelatine since it is produced in large amounts during the manufacture of chromium-tanned leather. This scrap is produced as a by-product of tanning operations wherein various chromium salts are added to the skins in order to impart desired properties thereto. This scrap is produced in various forms, loosely characterized by size as splits, trimmings, shavings and the like. Splits have the largest size, while shavings are finely divided and contain a large proportion of dust-like particles. This material is generally blue in color and may contain from 10,000–50,000, usually 30,000–40,000 parts per million of chromium. The chromium present in this stock is generally in the trivalent oxidation state in a coordination complex with the collagen of the hide.

Although chrome waste or scrap stock has long been recognized as a potentially valuable source of gelatine it is largely unused as a gelatine stock because it is not directly suitable for the conventional processes by which gelatine is made from traditional raw materials such as ossein, pigskin, limed hide splits and the like. If the usual techniques were applied directly to chrome stock, the gelatine produced would have a high chromium content which would render it unfit for most applications and in particular for edible uses.

There are several known techniques for preparing gelatine from chrome-tanned stock. It is a feature of many of these that no attempt is made to remove chromium prior to the extraction of the gelatine. In these, conditions of alkalinity and temperature are chosen so that as the gelatine is extracted, chromium is simultaneously insolubilized within the residual stock. In other words, the chromium remains in the stock while the gelatine is extracted. Such a process is exemplified in British Pat. No. 566,350 wherein gelatine is extracted by heating the waste chrome stock in an ammoniacal solution of disodium phosphate. British Pat. No. 338,584 extracts gelatine by heating the chrome stock at 105° C. with a suspension of magnesium oxide. A similar process using magnesium oxide is also disclosed in U.S. Pat. No. 1,612,746. A slightly more complicated process for gelatine extraction from chromium stock is disclosed in U.S. Pat. No. 1,629,556 wherein the stock is first made alkaline with lime and then treated with magnesium sulphate to precipitate magnesium hydroxide within the stock prior to hot-water extraction of the gelatine.

A more recent disclosure of a process wherein chromium is fixed on the stock and gelatine extracted therefrom is set forth in U.S. Pat. No. 3,232,924. This patent describes a process wherein the chrome stock is impregnated with an aluminium hydrate whereby the chromium is fixed onto the stock and the stock contacted with an aqueous extraction liquid to form an extract liquor containing a chromium-free gelatine. The gelatine prepared by this process may have a chromium content of as little as 9 ppm. However, the gelatine has an unsatisfactory bloom of only 100 grams and a viscosity of only 20 mpoise. Such gelatine would be regarded as a technical grade and would have only limited usefulness. In the aforementioned processes wherein the chromium is fixed onto or in the chrome stock, it is generally believed by those skilled in the art that although the chromium content may be low, the alkaline and high temperature extractions combine to give a gelatine of poor quality, that is having blooms of less than about 100 grams and viscosities of about 20 mpoise.

Alternatively, attempts have been made to first remove the chromium from the stock before the gelatine is extracted in an effort to produce a low chromium content gelatine. Carboxylic acids have been used for this purpose and such acids include oxalic acid as disclosed in U.S. Pat. No. 1,340,721 and citric, lactic or glycolic acids as disclosed in British Pat. Nos. 557,594 and 566,349. The thus treated stock may or may not be subjected to further conditioning treatments before the gelatine is extracted. Again, while no specifications are given for the gelatines produced, it is generally believed that these may contain quite high levels of chromium and are therefore unsuitable for most applications.

It is apparent from the prior art that the problem of producing a gelatine which has a low chromium content such as below 100 ppm, as well as a desirable bloom strength of about 200–300 grams or better and an acceptable viscosity of from about 30–50 mpoise or better from a chrome stock has not yet been satisfactorily achieved. I have now discovered a new process for preparing a low-chromium content edible gelatine having desirable bloom and viscosity from a chrome stock. The process also provides for precipitation of chromium from the treatment solution to enable reuse of the treatment solution. The present invention is characterized by the removal of chromium prior to gelatine extraction.

More particularly, a process for preparing a low chromium content gelatine from a leather stock or scrap containing trivalent chromium is provided. The process comprises treating scrap which contains trivalent chromium with a solution of a compound which forms soluble coordination complexes with the trivalent chromium to remove the major amount of chromium present in the scrap or stock followed by the conditioning of the treated stock to partially depolymerize the collagen network of the stock and then oxidizing a substantial portion of the residual trivalent chromium in the stock to the hexavalent state followed by washing the oxidized stock containing hexavalent chromium to remove the hexavalent chromium therefrom and then extracting the gelatine from the washed stock. Chromium may be selectively precipitated and removed from the treating solution to remove sufficient chromium from this solution to enable reuse of the treating solution in the process thereby reducing chemical loss and improving the overall efficiency of the process.

The process of the present invention is applicable to various materials which arise as a by-product from tanning or other operations wherein various chromium salts are added to collagen in order to impart desirable properties thereto. This scrap is produced in various forms, loosely characterized by size as splits, trimmings, shavings or the like. Splits have the largest size, where shavings are finely divided and contain a large proportion of dust-like particles. This waste material may contain from about 10,000 to 50,000, usually 30,000 to 40,000 parts per million of chromium. The chromium is present in the trivalent oxidation state in a co-ordination complex with the collagen. Thus, any chrome scrap of the proper size containing trivalent chromium complexed with collagen may be used as the starting material in the process of this invention. However, splits are the preferred form of raw material. As indicated, other forms of scrap such as shavings are also suitable for treatment by this process.

The process of the invention is schematically set forth in the accompanying flow-sheet drawing. The drawing includes not only the essential steps of the process but also illustrates certain optional steps. As is evident from the drawing, the process is a multi-stage process which essentially includes preliminary dechroming, conditioning the resultant material to depolymerize collagen, oxidation of the conditioned stock to convert the remaining chromium to the hexavalent state, extraction of the gelatine from the oxidized material and preferably deionization to remove residual chromium. Optional steps include precipitation of chromium from chromium rich liquors from the various steps and recycling of the chromium lean liquors to the process. Since the preparation of gelatine may be a time-consuming process, a major objective of this invention is to confine all stages prior to the extraction of gelatine to five days.

The first portion of the process is a preliminary dechroming step wherein the majority of the trivalent chromium present is removed and preferably over 80% of the chromium present is extracted from the stock. It is important that the majority of the chromium, preferably more than 80%, be removed before the chrome stock is conditioned to ensure the production of a gelatine having the desired properties in an efficient process.

In a preferred embodiment, the preliminary dechroming is obtained by treating the splits with three parts by weight of a 10% weight/volume solution of sodium glycolate, having a pH of 8.0 to 9.0, for twenty-four hours at 40° C. This chrome rich solution is removed and a second, identical chromium extraction is made by treating the splits with a fresh glycolate solution. In this way, most of the chromium present is displaced from the scrap and dissolved in the solution.

While sodium glycolate is preferred, other compounds which also form co-ordination complexes with trivalent chromium may be used. These compounds include the mono-carboxylic acids such as acetic, formic and the like acids or their salts; dicarboxylic acids such as oxalic, phthalic and the like or their salts; tricarboxylic acids such as citric or the like and their salts; hydroxy-carboxylic acids such as glycolic, lactic, tartaric or the like acids and their salts; amino-carboxylic acids such as glycine and the like. Other compounds which may be used include phosphates, such as trisodium ortho-phosphate, sodium tripolyphosphate and other molecularly dehydrated alkali metal phosphates; sodium borate; polyhydric alcohols such as ethylene glycol and phenols such as resorcinol. Of the salts, it is preferred to use the alkali-metal salts such as sodium, potassium and the like. The salts may be added as such or formed in situ. Sodium glycolate is prepared by neutralizing the acid, hydroxy-acetic acid, with caustic soda.

Of the compounds forming co-ordination complexes with chromium, lactic, citric, oxalic and tartaric acids or their salts are as effective as the preferred sodium glycolate for use in the process.

As noted, the objective of the preliminary dechroming step is to remove a majority of the chromium present and preferably more than 80%. The exact amount of chromium removed will depend upon a variety of factors including the number of times the stock is treated with the treating solution, the temperature, the concentration of the treating solution, the pH and the like, all of which are readily determined by one of ordinary skill in the art. For example, as the temperature of the treating solution increases above ambient, the rate of extraction of chromium also increases. However, the expense of the process increases as more energy is required to heat the solution to a higher temperature and therefore the overall economic feasibility of the process must be taken into consideration in determining the reaction conditions. It is desirable that the process enable the production of low chromium content galatine having good properties at an economical cost. In this regard, we have demonstrated that the extraction rate improves as the temperature is increased to about 50° to 60° C. One may select an optimum temperature on the basis of extraction rate versus energy consumption. Temperatures above ambient temperature are usually preferred.

Similarly, while a concentration of 20% of sodium glycolate could be used and is about as effective as the 10% solution, the cost of replacing chemical losses from such a solution becomes prohibitive. Concentrations of 1% and 5% do not remove a sufficient amount of chromium in a reasonable length of time. A range of from about 10 to 20% is preferred. While a pH of about 8 to 9 is preferred, since the removal of chromium by sodium glycolate is somewhat more efficient at an alkaline pH, satisfactory dechroming may be achieved at any pH in the range between 5 and 12, for example a range of from 5 to 9. Similarly, while two one-day extractions of chromium are preferred, even more chromium may be removed when the number of extractions is increased to three or four. It will be apparent from the above that various materials will effectively displace chromium from the stock over a wide range of conditions.

It is also preferred that prior to conditioning, the stock be washed several times with water, each washing lasting for preferably one hour. The washing is preferable so that any sodium glycolate absorbed by the stock may be washed away before the conditioning since glycolate present in the conditioning liquor will reduce the ultimate yield of gelatine.

In a further aspect of the present invention and to minimize chemical cost, it is advantageous to reuse the solution containing the chromium complex by selectively precipitating chromium therefrom. For example, it has been found that at room temperature, most of the chromium can be precipitated when the chromium-containing glycolate solution is made 1 or 2% in sodium hydroxide, and then lime is added at two or three times the weight of the chromium present in the solution. The chromium precipitation may be accelerated by raising the temperature as desired. The precipitated chromium may be separated from the sodium glycolate solution by filtration, centrifugation, and the like. In this way, more than 98% of the chromium present in the used glycolate solution may be precipitated and recovered; the dechromed glycolate solution may then be reused in the process. The chromium concentration of the glycolate solution may be determined by standard procedures. A specific embodiment of this aspect of the invention is set forth in Example 14.

Once a majority of the trivalent chromium has been removed from the stock and the stock optionally washed, the stock is conditioned with an alkaline sulphate solution to partially depolymerize the collagen network of the stock. Conditioning is necessary so that the gelatine may be subsequently extracted from the stock. It is accomplished by treatment with preferably 3 parts by weight of a 10% weight/volume solution of sodium hydroxide containing sodium sulphate (15% weight/volume) for eight hours at ambient temperature. The unabsorbed solution is then drained off and the stock left for a further 40 hours before subjecting the stock to oxidation. In this way, the stock is conditioned so that more than 50% of the collagen present may be subsequently extracted as gelatine.

While a 10% solution of sodium hydroxide is preferred, concentrations of 9, 11 and 12% give comparable yields of gelatine as can be seen from Example 5. Moreover, the conditioning liquor which has not been absorbed by the stock is drained off after eight hours. However, this is not essential and the conditioning liquor may be left in contact with the stock throughout the two days of conditioning. In this case, sodium hydroxide concentrations of 4 to 12% are effective and the concentration of sodium sulphate may be increased to about 20%. Thus, concentrations of from about 3 to 15% sodium hydroxide and from about 10 to 20% sodium sulphate may be used. In addition the used alkali sulphate solution can be dechromed by lime or other suitable means which enables reuse in the process. The dechroming with lime may be effected by a quantity of lime equal to twice the weight of chromium present. The suspension may be allowed to stand for six hours and the precipitated chromium separated.

It is the object of the conditioning to effect a controlled partial depolymerization of the collagen network so that a sufficient quantity of the collagen will subsequently dissolve as gelatine and the average molecular weight of the gelatine will be high enough to give a good bloom strength and viscosity. In alkaline conditioning, the depolymerization is the result of hydrolysis of the peptide bonds of collagen. The use of a strong base, for example sodium hydroxide, shortens the time required, but if used alone the stock will swell excessively. This lyotropic swelling, if excessive, makes the stock very fragile which in turn leads to uncontrollable losses of material during subsequent washing stages. Certain salts such as sodium sulphate, sodium thiosulphate and the like at a sufficiently high concentration retard lyotropic swelling and thereby allow a more controlled conditioning. While solutions of sodium hydroxide containing sodium sulphate or sodium thiosulphate are preferred for conditioning, conditioning may also be effected using a lime or mineral acid treatment. The thus conditioned stock is preferably washed to remove excess conditioning solution; for example, by washing three times each for an hour with water. It is clear that various known conditioning processes may be used to obtain the object of the step which as stated is to partially depolymerize the collagen network of the stock. Also, the exact concentration of acid or base as well as the specific acid or base used may vary depending upon the degree of depolymerization desired in the time available.

The next step in the process is to oxidize a substantial portion of the residual trivalent chromium present in the stock to the hexavalent state since the chromium remaining in the stock at this stage is still trivalent and still co-ordinately bonded to the collagen. If oxidation were not effected at this stage, the trivalent chromium would be carried through to the gelatine extracts and such chromium would not be removed by deionization. Therefore, the stock is treated with an oxidizing agent to oxidize the trivalent chromium to the hexavalent state. Various oxidizing agents may be used such as sodium perborate, ammonium persulphate, hydrogen peroxide, and the like, as in Example 4. The oxidation may be conducted at any alkaline pH of from about 8 to about 13 but a preferable range is between 10.0 and 12.5.

In a preferred embodiment, the stock is treated for one day with sufficient hydrogen peroxide under alkaline conditions to oxidize most of the chromium present from the trivalent to the hexavalent oxidation state. In the hexavalent oxidation state, the chromium is soluble and may be washed away, thereby reducing the chromium content of the stock. Sodium carbonate is used to maintain a pH of between 10 and 12.5 where the lowest chromium contents may be obtained. The oxidized chromium stock is then washed, thereby removing the resultant soluble hexavalent chromium. This stock may for example be washed three times, each for an hour, to remove the chromium.

Gelatine may now be extracted from the conditioned stock using a series of extractions with progressively increasing temperatures as illustrated by Example 1. In the case of a bovine hide stock the bloom strength is highest in the low-temperature extract and decreases as the extract temperature increases. The reverse is usually true of viscosity. Before the gelatine is extracted, the pH of the stock is reduced by the addition of an acid. Any suitable acid may be used such as hydrochloric, phosphoric, or the like. Four extractions of gelatine, each of three hours, are made into a volume of water equal to the original weight of the splits. Preferably, a temperature of 60° C. is used for the first extraction, and 70°, 80° and 95° C. for the second, third and fourth, respectively. A quantity of magnesium oxide of from about 0.2 to 1.0% by weight of the splits, may preferably be included in each extraction and the pH maintained between about 6.0 and 8.5 by the addition of acid or alkali as required. It was found that gelatine extracted in the absence of any added magnesium oxide had a higher chromium content than when magnesium oxide was present. This is due to the ability of the magnesium oxide to insolublize chromium. By choosing a combination of pH and a quantity of magnesium oxide, the lowest chromium content may be obtained. Magnesium sulfate may be substituted for magnesium oxide but produces a gelatine of higher ash content.

The gelatine solutions may then be clarified by conventional procedures such as filtration, flocculation, centrifugation and the like. If a further reduction in the chromium content of the gelatine is desired, the clarified extracts may be deionized by passage through a strong anion-exchanging resin and a strong cation-exchanging resin either sequentially or in the form of a mixed bed. Exemplary of the many available ion exchange resins which may be used are those marketed under the trademarks Dowex AG1-X8 and Dowex AG50W-X8. The gelatine solutions are then concentrated and dried by suitable means to obtain a low chromium content gelatine having both good bloom strength and viscosities and suitable for edible use.

EXAMPLE 1

Two kilograms of chromium-tanned splits were treated with six liters of a sodium glycolate solution (10% w/v; pH 8–9) for twenty-four hours at 40° C. This first solution was drained and replaced with six liters of a fresh solution (10%, w/v; pH8–9). A second extraction was made for twenty-four hours at 40° C. This solution was drained and the splits were washed four times with water; each wash was for one hour at ambient temperature with four parts by weight of water. Six liters of a solution of sodium hydroxide (10%, w/v) containing sodium sulphate (20%, w/v) were added and, after eight hours, unabsorbed liquor was drained off. The splits were allowed to stand for forty hours and were then washed three times with water; each was for one hour at ambient temperature with four parts by weight of water. The splits were then treated with six liters of a solution of sodium carbonate (5%, w/v) containing hydrogen peroxide (5%, by weight of splits) for twenty-four hours at ambient temperature. After washing three times (each for one hour at ambient temperature with four parts by weight of water), hydrochloric acid was added to reduce the pH of the splits to 8.0 to 8.5. Gelatine was extracted from the splits into two liters of water. Four three-hour extractions were made at increasing temperatures, i.e. 60°, 70°, 80°, 95°. The pH of each extraction was maintained at 8.0 to 8.5 and magnesium oxide (1% by weight of stock) was included in each extract. Each individual extract was clarified and then deionized by passage through Dowex AG1-X8 and Dowex AG50W-X8 in the form of a mixed bed. After drying the extracts, the gelatine obtained had the following characteristics:

| Extract Temp. (° C.) | Bloom Strength (6-⅔% Solution) | Viscosity (6-⅔% Solution) | Chromium (ppm) |
|---|---|---|---|
| 60 | 245 | 38.5 | 7 |
| 70 | 157 | 43.0 | 26 |
| 80 | 126 | 63.5 | 63 |
| 95 | 78 | 37.5 | 99 |

This example shows the effect of variations of the extraction temperature on the gelatine product.

EXAMPLE 2

Gelatine was prepared from chromium-tanned splits as described in Example 1, above, but with these differences:

(a) The pH during gelatine extractions was controlled in the ranges of 6.0–6.5, 7.0–7.5, 8.0–8.5.

(b) Magnesium oxide was included in each extract at either 0.2% or 1.0% (by weight of stock).

The gelatines obtained had the following characteristics.

| Conditions of Extraction | | First Extract (60° C.) | | | Second Extract (70° C.) | | |
|---|---|---|---|---|---|---|---|
| MgO used (%, by Weight of Stock) | pH | Chromium (ppm) | Bloom (g) | Viscosity (mpoise) | Chromium (ppm) | Bloom (g) | Viscosity (mpoise) |
| 0.2 | 6.0–6.5 | 55 | 252 | 35.5 | 60 | 249 | 48.5 |
|  | 7.0–7.5 | 66 | 327 | 42.0 | 50 | 260 | 55.0 |
|  | 8.0–8.5 | 70 | 263 | 32.5 | 41 | 251 | 45.5 |
|  | 8.0–8.5 | 24 | 284 | 37.0 | 14 | 235 | 52.5 |
| 1.0 | 6.0–6.5 | 23 | 223 | 36.5 | 23 | 159 | 44.5 |
|  | 7.0–7.5 | 15 | 231 | 40.5 | 25 | 158 | 55.0 |
|  | 8.0–8.5 | 7 | 245 | 38.5 | 26 | 157 | 43.0 |
| Conditions of Extraction | | Third Extract (80° C.) | | | Fourth Extract (95° C.) | | |
| MgO Used (%, by Weight of Stock) | pH | Chromium (ppm) | Bloom (g) | Viscosity (mpoise) | Chromium (ppm) | Bloom (g) | Viscosity (mpoise) |
| 0.2 | 6.0–6.5 | 55 | 203 | 60.0 | 64 | 162 | 64.5 |
|  | 7.0–7.5 | 64 | 194 | 65.5 | 73 | 161 | 81.0 |
|  | 8.0–8.5 | 61 | 177 | 45.0 | 66 | 137 | 46.5 |
|  | 8.0–8.5 | 45 | 180 | 63.5 | 91 | 127 | 59.5 |
| 1.0 | 6.0–6.5 | 38 | 131 | 55.5 | 92 | 78 | 49.5 |
|  | 7.0–7.5 | 52 | 131 | 60.0 | 75 | 74 | 44.0 |
|  | 8.0–8.5 | 63 | 136 | 63.5 | 99 | 78 | 37.5 |

EXAMPLE 3

Gelatine, prepared from chromium-tanned splits as described in Example 1, was clarified and then deionized (as described above). The removal of chromium effected by these treatments was:

| Extract Temperature (° C.) | Chromium of Crude Extract (ppm) | Chromium of Clarified and Deionized Extract (ppm) |
|---|---|---|
| 60 | 110 | 7 |
| 70 | 135 | 26 |
| 80 | 180 | 63 |
| 95 | 295 | 99 |

EXAMPLE 4

Gelatine was prepared from chromium-tanned splits as described in Example 1, except that:

(a) The conditions and agents used for oxidation were varied;

(b) The pH during oxidation was varied;

(c) There was no addition of magnesium oxide during the gelatine extractions.

These various conditions of oxidation gave gelatines having the following chromium contents (as determined in clarified and deionized gelatines):

| Oxidizing Agent | Amount Used (% by Weight of Splits) | pH of Oxidation | Chromium in Gelatine (ppm) |
|---|---|---|---|
| None | — | — | 800 |
| $H_2O_2$ | 5 | 8–10 | 240 |
|  | 5 | 10–12 | 190 |

-continued

| Oxidizing Agent | Amount Used (% by Weight of Splits) | pH of Oxidation | Chromium in Gelatine (ppm) |
|---|---|---|---|
| | 5 | 12–13.3 | 320 |
| $H_2O_2$ | 10 | about 10 | 140 |
| $NH_4$-Persulphate | 46* | about 8 | 130 |
| Na Perborate | 31* | about 10 | 130 |

*Amounts equivalent to 5% of $H_2O_2$, mole for mole.

EXAMPLE 5

Gelatine was prepared from chromium-tanned splits as described in Example 1, except that sodium hydroxide concentrations of 9, 10, 11 and 12% were used for the conditioning. This resulted in yields of gelatine as follows:

| Concentration of NaOH (%, w/v) | 9 | 10 | 11 | 12 |
|---|---|---|---|---|
| Concentration of $Na_2SO_4$ (%, w/v) | 15 | 15 | 15 | 15 |
| Yield of Gelatine (%) | 54.2 | 51.2 | 49.7 | 52.2 |

EXAMPLE 6

Gelatine was prepared from chromium-tanned splits as described in Example 1, excepting that:

(a) The conditioning solution was not drained off after eight hours, but was present for the two days of conditioning;

(b) Various concentrations of sodium hydroxide were used for the conditioning;

(c) In one case, a 20% sodium sulphate solution was substituted for the usual 15%.

This resulted in gelatine yields as follows:

| Concentration of NaOH (%, w/v) | 4 | 4 | 5 | 6 | 8 | 10 | 12 |
|---|---|---|---|---|---|---|---|
| Concentration of $Na_2SO_4$ (%, w/v) | 15 | 20 | 15 | 15 | 15 | 15 | 15 |
| Yield of Gelatine (%) | 54.2 | 55.9 | 54.7 | 36.3 | 42.0 | 56.0 | 54.9 |

EXAMPLE 7

Gelatine was prepared from chromium-tanned splits as described in Example 1, excepting that:

(a) Magnesium oxide was not present during the extraction of gelatine;

(b) The washing stage prior to conditioning was varied to produce a range of concentrations of sodium glycolate carried over into the conditioning solution.

The yield of gelatine given, after a conditioning in the presence of sodium glycolate was:

| Concentration of Glycolate During Conditioning (% w/v) | 2.75 | 0.24 | 0.16 | 0.08 |
|---|---|---|---|---|
| Yield of Gelatine (%) | 31.2 | 52.9 | 61.6 | 59.3 |

EXAMPLE 8

500g of splits were extracted with three parts by weight of a sodium glycolate solution (pH 8.0 to 9.0) at ambient temperature, for twenty-four hours. A second identical extraction was made with a fresh glycolate solution. The amount of chromium extracted using sodium glycolate solutions of various concentrations was:

| Glycolate Concentration (%, w/v) | 1 | 5 | 10 | 20 |
|---|---|---|---|---|
| Chromium Extracted (% of original) | 11.3 | 31.4 | 45.3 | 39.8 |

EXAMPLE 9

500g of splits were extracted with three parts by weight of a sodium glycolate solution (10%, w/v, pH 8.0 to 9.0) for twenty-four hours at 40° C. This extraction as repeated up to four times. The amount of chromium extracted by repeated treatments with sodium glycolate was:

| Number of One-Day Extractions | 1 | 2 | 3 | 4 |
|---|---|---|---|---|
| Chromium Extracted (% of Original) | 66.5 | 85.4 | 89.6 | 92.7 |

EXAMPLE 10

500g of splits were extracted with sodium glycolate (10% w/v) as described in Example 8 except that temperatures of ambient, 40°, 50° and 60° were used. The amount of chromium extracted at various temperatures was:

| Temperature of Extraction (° C.) | Ambient | 40 | 50 | 60 |
|---|---|---|---|---|
| Chromium Extracted (% of Original) | 45.3 | 84.6 | 90.6 | 89.4 |

EXAMPLE 11

500g of splits were extracted with sodium glycolate (10% w/v) as described in Example 8 except that:

(a) The temperature of extraction was 40, 50 or 60° C.;

(b) The pH was 5.0, 6.0, 7.0, 8.0 or 9.0.

The amount of chromium extracted at these temperatures and pH values was:

| pH of Extraction | Chromium Extracted from Stock (%) | | |
|---|---|---|---|
| | at 40° C. | at 50° C. | at 60° C. |
| 5 | 81.7 | 87.9 | 88.3 |
| 6 | 83.1 | 87.7 | 89.0 |
| 7 | 84.2 | 88.7 | 89.0 |
| 8 | 84.6 | 90.6 | 89.4 |
| 9 | 86.9 | 93.0 | 92.2 |

EXAMPLE 12

Other potential dechroming agents were evaluated by extracting 500g of splits with three parts by weight of solution at 40° C. for twenty-four hours. A second, identical extraction was made with a fresh solution. The amount of chromium extracted by the following dechroming agents was:

| Agent | Concentration Used (%, w/v) | Chromium Extracted (% of Original) |
|---|---|---|
| Tartaric Acid | 10 | 79.4 |
| Sodium Tartrate | 10 | 87.4 |
| Lactic Acid | 10 | 83.4 |
| Sodium Lactate | 10 | 79.3 |

| Agent | Concentration Used (%, w/v) | Chromium Extracted (% of Original) |
|---|---|---|
| Citric Acid | 10 | 84.8 |
| Sodium Citrate | 10 | 87.7 |
| Formic Acid | 10 | 76.4 |
| Sodium Formate | 10 | 31.2 |

| Agent | Concentration Used (%, w/v) | Chromium Extracted (% of Original) |
|---|---|---|
| Acetic Acid | 10 | 56.1 |
| Sodium Acetate | 10 | 35.1 |
| Sodium-Potassium Phthalate | 10 | 37.3 |
| Resorcinol | 10 | 18.5 |
| Sodium Oxalate | 2.5 | 80.1 |

EXAMPLE 13

Other potential dechroming agents were evaluated by extracting 500 g of splits with two parts by weight of solution at 50° C. for twenty-four hours. The amount of chromium extracted by the following dechroming agents was:

| Agent | Concentration Used (%, w/v) | Chromium Extracted (% of Original) |
|---|---|---|
| Glycine | 10 | 61.3 |
| Borax | 10 | 66.1 |
| Trisodium Phosphate | 10 | 46.5 |
| Tripolyphosphate | 10 | 57.1 |
| Sodium Hexametaphosphate | 10 | 49.4 |
| Ethylene Glycol | 10 | 51.1 |

EXAMPLE 14
RECOVERY OF CHROMIUM FROM USED GLYCOLATE LIQUORS

The concentration of chromium present in the used chromium containing glycolate solution is determined by standard analysis and the total volume of the solution measured. Then sufficient sodium hydroxide is added to give a 1% (w/v) concentration of sodium hydroxide and the temperature is raised to 60° C. Calcium oxide is added to the solution in an amount equal to three times the weight of chromium present. The mixture is stirred and then allowed to stand at 60° C. for three hours. The co-precipitate of chromium and calcium hydroxides formed is then separated from the sodium glycolate solution by filtration, centrifugation, or the like. This process may be repeated until the desired amount of chromium is removed as illustrated in the following table.

| | Chromium Concentration of used glycolate solution (ppm) | Chrome Remaining after Dechroming (ppm) | % Dechroming | No. of Replications |
|---|---|---|---|---|
| First Solution | 2,690 ± 131 | 49.0 ± 18 | 98.8 ± 0.6 | 10 |
| Second Solution | 1,208 ± 44 | 12.1 ± 6 | 98.9 ± 0.5 | 8 |

As can be seen from the treatment of the above first and second solutions, greater than 98% of the chromium present in the used glycolate solutions may be precipitated and removed. The dechromed glycolate solutions may then be reused in the process.

What is claimed is:

1. A process for preparing low chromium content gelatine from a chrome leather stock containing trivalent chromium, comprising:
    extracting a trivalent chromium containing leather stock with a solution of a compound which forms coordination complexes with trivalent chromium to remove a major amount of chromium present in said stock;
    conditioning the extracted leather stock with an alkaline solution containing sodium sulfate to partially depolymerize the collagen network of said leather stock;
    oxidizing a substantial portion of the residual trivalent chromium in the conditioned leather stock to the hexavalent state by treatment with hydrogen peroxide at a pH in the range of about 10 to 12.5 under approximately ambient temperature conditions;
    washing said oxidized stock to partially remove said hexavalent chromium; and
    extracting gelatin from the washed leather stock with an extracting solution containing magnesium oxide or sulfate.

2. The process of claim 1 wherein at least about 80% of the trivalent chromium is removed with a solution of a compound which forms soluble coordination complexes therewith.

3. The process of claim 1 wherein the compound which forms soluble coordination complexes with trivalent chromium is selected from the group consisting of monocarboxylic acids, dicarboxylic acids, tricarboxylic acids, hydroxycarboxylic acids, aminocarboxylic acids, phosphates, borates, polyhydric alcohols, phenols and salts of said carboxylic acids.

4. The process of claim 1 wherein the stock is treated at a temperature above ambient temperature with a solution of a compound which forms soluble coordination complexes with trivalent chromium.

5. The process of claim 1 wherein the stock is washed several times with water prior to the conditioning step.

6. The process of claim 1 wherein the treating solution containing trivalent chromium complex is treated to selectively precipitate chromium therefrom, said precipitated chromium is separated as a byproduct, and the dechromed solution retaining the compound which forms a soluble coordination complex with trivalent chromium is reused in treating said chrome stock.

7. The process of claim 1 wherein the conditioned partially depolymerized collagen containing stock is washed with water prior to any oxidation of the residual trivalent chromium.

8. The process of claim 1 wherein magnesium oxide is present during the extraction of gelatine from the washed stock.

9. The process of claim 3 wherein an acid or salt from an acid selected from the group consisting of lactic, citric, oxalic, tartaric and glycolic acid is used in the process.

10. The process of claim 3 wheren the chromium complexing compound is glycolic acid and is present in an aqueous solution in the concentration of from about 10 to 20%, said solution having a pH of from between about 5 to 9.

11. The process of claim 6 wherein the chromium is precipitated by adding 1 or 2% sodium hydroxide and lime in an amount which is two or three times the weight of the chromium present in the solution.

12. The process of claim 1 wherein the alkaline sulphate solution contains from about 4 to about 15% sodium hydroxide and from about 15 to about 20% sodium sulphate and is applied for at least about 8 hours at ambient temperature.

13. The process of claim 9 wherein the trivalent chromium complexing compound is sodium glycolate.

14. The process of claim 1 wherein the gelatine extraction is carried out at a temperature in the range of 60° C. to 95° C.

15. The process of claim 1 wherein the gelatine extraction is carried out in a plurality of steps with increasing temperature for each succeeding step, the first step being conducted at approximately 60° C.

16. A process for preparing low chromium content gelatine of minimum bloom strength of 200 grams and minimum viscosity of 30 mpoise from a chrome leather stock containing trivalent chromium, comprising:
   extracting a trivalent chromium containing leather stock with a solution of sodium glycolate at a pH of about 5 to 9 to remove a major amount of trivalent chromium present in said stock;
   conditioning the extracted leather stock with an alkaline solution containing sodium sulfate to partially depolymerize the collagen network of said leather stock;
   oxidizing a substantial portion of the residual trivalent chromium in the conditioned leather stock to the hexavalent state by treatment with hydrogen peroxide at a pH in the range of about 10 to 12.5 under approximately ambient temperature conditions;
   washing said oxidized stock to partially remove said hexavalent chromium;
   extracting gelatin from the washed leather stock with an extracting solution containing magnesium sulfate; and
   removing additional hexavalent chromium from the extracted gelatin by deionization.

17. The process of claim 16 wherein the extracted gelatine is clarified and deionized by passage through a strong anion-exchanging resin and a strong cation-exchanging resin.

* * * * *